April 11, 1967 F. W. VAHLDIEK ETAL 3,313,004
HIGH PRESSURE ELECTRICAL RESISTANCE CELL
Filed June 14, 1965
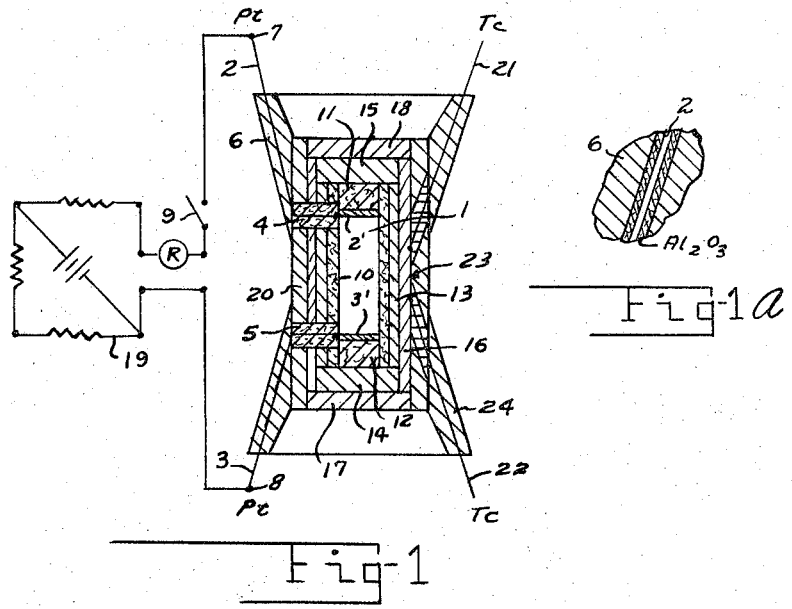
Fig-1
Fig-1a
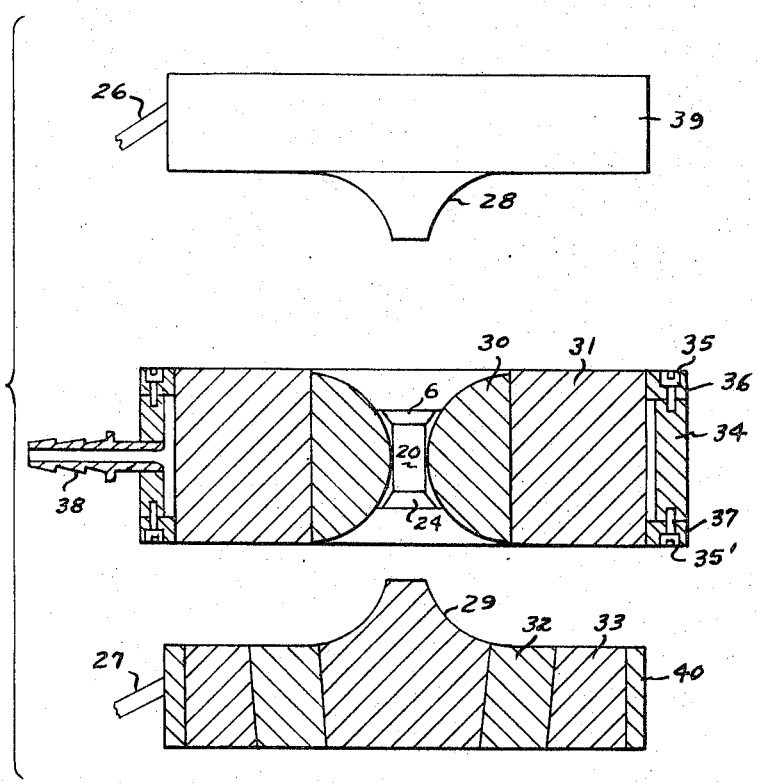
Fig-2
INVENTORS
FRED W. VAHLDIEK
CHARLES T. LYNCH
BY
ATTORNEYS ns Patent Office 3,313,004
Patented Apr. 11, 1967

3,313,004
HIGH PRESSURE ELECTRICAL RESISTANCE CELL
Fred W. Vahldiek, 5851 Barrett Drive, Dayton, Ohio 45431, and Charles T. Lynch, 387 Cherrywood Drive, Fairborn, Ohio 45324
Filed June 14, 1965, Ser. No. 463,970
2 Claims. (Cl. 18—34)

The invention described herein may be manufactured and used by or for the United States Government for governmental purposes without the payment to us of any royalty thereon.

This invention concerns an appartus comprising a high-pressure, high-temperature, reaction vessel or cell, within a punch and die assembly of the belt type, that minimizes the poisson effect.

The object of the present invention is to provide a high-pressure electrical resistance cell for use with a belt type of punch and die apparatus, that is adapted for accurate resistance and temperature instrumentation of the specimen throughout the optimum stresses and temperatures to which it is subjected.

Examples of the prior belt type punch and die apparatus that is here of interest, are disclosed in the U.S. Patents to Bundy, Nos. 2,947,611 and 3,107,395; to Hall, Nos. 2,947,608, 2,947,610 and 2,941,248; and to Wentorf, Jr., No. 2,996,763.

This invention provides a high-temperature, high-pressure resistance cell with a platinum plate against each of both ends of the specimen within the resistance cell and connected with the platinum resistance leads as a resistor leg of a Wheatstone bridge. The invention provides the hot terminal of a thermocouple against the insulation of the heating element of the apparatus. The invention further provides a punch belt apparatus temperature control for the continuous circulation of a coolant therethrough.

A successfully operative embodiment of the present invention is illustrated in the accompanying drawings wherein:

FIG. 1 is an axial, sectional view of the reaction vessel that embodies the present invention, and diagrammatically with the specimen indicated as one leg of a Wheatstone bridge;

FIG. 1a is an enlarged, fragmentary, sectional view, partially broken away and in section, of either the platinum resistance wire or the thermocouple wire in FIG. 1 within alumina sheaths as machine fit within lava parts of the device in FIG. 1; and FIG. 2 is a displaced view, partly in section, of the tapered punch belt apparatus with the reaction vessel in FIG. 1 in place for being compressed.

FIG. 1 illustrates the preferred reaction vessel that contains the sample or specimen receiving compartment or cell 1. Platinum resistance leads 2 and 3 end in flat platinum plates 2' and 3' that are dimensioned to fill the cross section of the compartment 1 at the opposite ends of the cell. The platinum leads 2 and 3 are separately enclosed in alumina sheaths for their protection, as indicated in FIG. 1a.

The platinum leads in their alumina sheaths, are cemented within alumina plugs 4 and 5 and continue within a lava funnel wall 6 to outside of the assembly, where the leads 2 and 3 end in terminal contacts 7 and 8, respectively. Resistance measurements on the instrument R are indicated on the closing of the switch 9 which connects the cell in FIG. 1 into the circuit of the Wheatstone bridge 19.

The specimen receiving compartment 1 is lined with a boron nitride cylinder 10 that is plugged at its ends with a pair of lava plugs 11 and 12. A cylinder of graphite 13 is disposed outside of the boron nitride cylinder 10 and serves to heat the reaction vessel. The lower ends of both the boron nitride cylinder 10 and the graphite cylinder 13 rest on a graphite disk 14. On the upper ends of both the boron nitride cylinder 10 and the graphite cylinder 13 rests a cover graphite disk 15 that duplicates in shape and dimensions the graphite disk 14. The graphite disks 14 and 15 plug the opposite ends of a second boron nitride cylinder 16.

A pair of steel disks 17 and 18 overlie the opposite ends of the second boron nitride cylinder 16, and are flush with the ends of the lava cylinder 20, well below the open ends of the frusto-conical lava funnel walls 6 and 24. In operation the pair of steel disks transmit the full force that is applied to the cell. The steel disks 17 and 18 also plug the opposite ends of the lava cylinder 20.

The alumina sheathed thermocouple leads 21 and 22 are cemented into the side of the lava cylinder 20 on its side that is remote from the alumina plugs 4 and 5. The inner ends of the thermocouple leads 21 and 22 are joined in their welded hot junction 23. The thermocouple hot junction 23 is positioned against the radially outer side of the second boron nitride cylinder 16 intermediate the ends thereof and is cemented in place. The pair of thermocouple leads 21 and 22 within their alumina sheaths continue within the lava frusto-conical funnel walls 6 and 24 and lead to a temperature reading instrument such as a high precision, calibrated potentiometer, not shown, disposed outside of the apparatus.

The tapered punches 28 and 29 shown in FIG. 2, are dimensioned to enter the funnel walls 6 and 24 and to deliver the force of their thrust against the steel disk 17 and 18 at the opposite ends of the cell in FIG. 1. The tapered die 30 minimizes the poisson effect of the radially directed thrust of the punches toward the binding ring 31.

Spaced radially outwardly from the binding ring 31 to provide a cooling compartment therebetween, is an outer ring 34. The outer ring 34 is secured by a desired plurality of screws 35, 35', etc., between the outer ring 34 and a pair of attaching rings 36 and 37. The outer ring 34 is provided with a pair of tubular fittings 38, of which but one is shown. The circulation of the coolant through the compartment maintains the tapered die 30 and binding ring 31 at a desired temperature.

The temperature of the specimen within the compartment 1 is reached by means of electrical energy that is supplied to the pair of leads 26 and 27 in a manner similar to the ways that are disclosed in the Bundy and the Wentorf, Jr. patents cited above, and with the graphite cylinder 13 and the graphite disks 14 and 15 serving as heating agent.

The bases of the tapered punches 28 and 29 are supported by a desired number of concentric binding rings, 32, 33, etc. The electrical leads 26 and 27 are connected to outermost binding rings 39 and 40, respectively.

The electrical resistance cell that is shown in the accompanying drawings, and that is described herein, is for use under high pressure such as 50 kbars or 50,000 atmosphere, operating at temperatures of which 1700° C. is illustrative.

The cell provides variably controlled heating rates, the simultaneous measurement of temperature and resistance of specimens under pressure, with minimum specimen contaminations. Isothermal and isobaric conditions may be maintained over the specimen for desired periods of time to allow complete sample equilibration before measurements are made on the samples.

The cell uses a graphite resistance heater, platinum resistance plugs, thermocouples of the composition platinum, and platinum with 10% rhodium, insulation that consists of boron nitride and lava and with the thermocouple and the resistance wire leads both encased in sheaths of alumina. Resistance measurements of the specimen are made by use of a conductivity bridge, or a Wheatstone bridge, as illustrated in the drawings.

The specimen itself, within the cell 1, is surrounded by a protective and an insulating boron nitride sleeve. The graphite cylindrical heater fits around the boron nitride sleeve. Another boron nitride cylinder and finally a lava cylinder encase the inner parts of the cell. All fits are tight with tolerances in the order of 0.001 of an inch.

The cell will maintain integrity at temperatures of 2000° C. for short periods of time. For higher temperatures selections may be made from noble metals other than platinum such, for example as Ir-Rh thermocouple and Rh resistance leads and plugs. For extended time periods, at least for runs up to 8 hours duration, isobaric and isothermal conditions at 1700° C. and at 50 kbars can be maintained. The graphite heater illustratively uses a power supply of 1000 amperes at 4 volts maximum.

The cell has been used to measure resistance changes of zirconium oxide under pressure. Specimens of the zirconium oxide were prefired to reduce shrinkage during a high pressure run, which minimized heater resistance lead and thermocouple failures caused by breakdown of cell insulation under pressure. The specimens were positioned in the high-pressure, high-temperature cell 1 and were compressed and heated in the belt-type, high-temperature device.

The cell is designed principally to use on oxide-type materials such as hafnium oxide, titanium oxide, and the like, but may be used on other refractory nonmetallic or metallic materials by changing the specimen and platinum lead wire dimensions and the resistance bridge arrangements, as appropriate.

It is to be understood that the structure of the device that is disclosed herein has been submitted as being a successfully operative and illustrative example of the present invention, and that modifications may be made in the disclosed structure without departing from the spirit and the scope of the present invention.

We claim:

1. The high-pressure and high-temperature reaction apparatus containing a reaction vessel within a punch and die assembly of the belt type that minimizes the poisson effect comprising a first boron nitride cylinder as a specimen housing first reaction cell for the disposition therein of the specimen to be tested; a graphite cylinder concentric with and radially outwardly from the boron nitride cylinder through the cylinder lengths; a lava plug within each opposite end of the boron nitride cylinder; a graphite disk overlying each of the opposite ends of both the first boron nitride cylinder and the graphite cylinder; a second boron nitride cylinder radially outside of and concentric with both the first boron nitride cylinder and the graphite cylinder and in the opposite ends of which the said graphite disks are positioned; a pair of frusto-conical lava walls spaced from and opening away from each other on the outside of the graphite cylinder and the walls extending axially beyond the opposite ends of the graphite cylinder in open frusto-conical funnel contour end portions; a pair of alumina sheathed thermocouple lead wires encased within the laval walls and joined in their hot junction in contact with the outer surface of the second boron nitride cylinder and beneath the lava cylinder about midway between the opposite cylinder ends; a pair of alumina sheathed platinum resistance wires encased within the lava walls substantially remote diametrically from the thermocouple lead wires; a pair of platinum resistance-wire encasing alumina plugs extending radially through the walls of the lava cylinder, the graphite cylinder and through both the first and the second boron nitride cylinders to within the specimen test chamber, and a pair of platinum sheet contacts at the opposite ends of the reaction cell provided by the first boron nitride cylinder and each platinum sheet contact welded to its end of its platinum resistance wire.

2. The reaction apparatus described in claim 1 in combination with a belt-type punch and die apparatus inclusive of a coolant circulation compartment maintaining the apparatus at a predetermined temperature.

References Cited by the Examiner

UNITED STATES PATENTS

| | | |
|---|---|---|
| 3,088,170 | 5/1963 | Strong. |
| 3,137,896 | 3/1964 | Daniels. |
| 3,172,988 | 3/1965 | Zeitlin. |
| 3,181,933 | 5/1965 | Wentorf. |

WILLIAM J. STEPHENSON, *Primary Examiner.*